J. W. ANDERSON.
BELT DRIVEN FRICTION GEARING.
APPLICATION FILED JULY 24, 1913.
1,096,146.
Patented May 12, 1914.
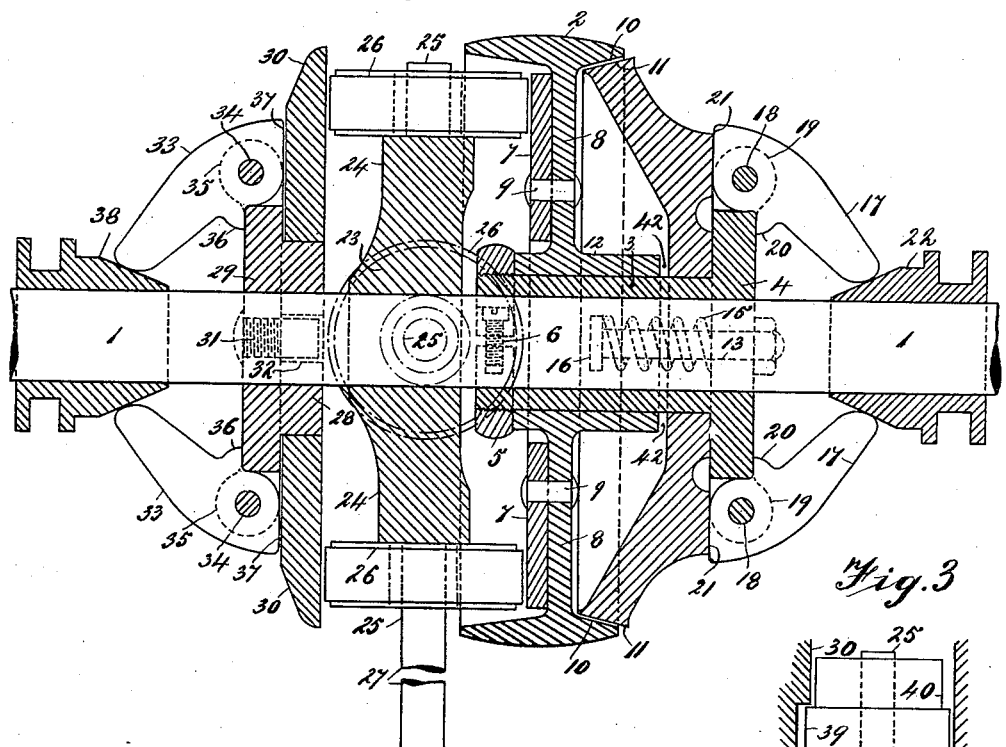
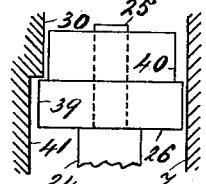
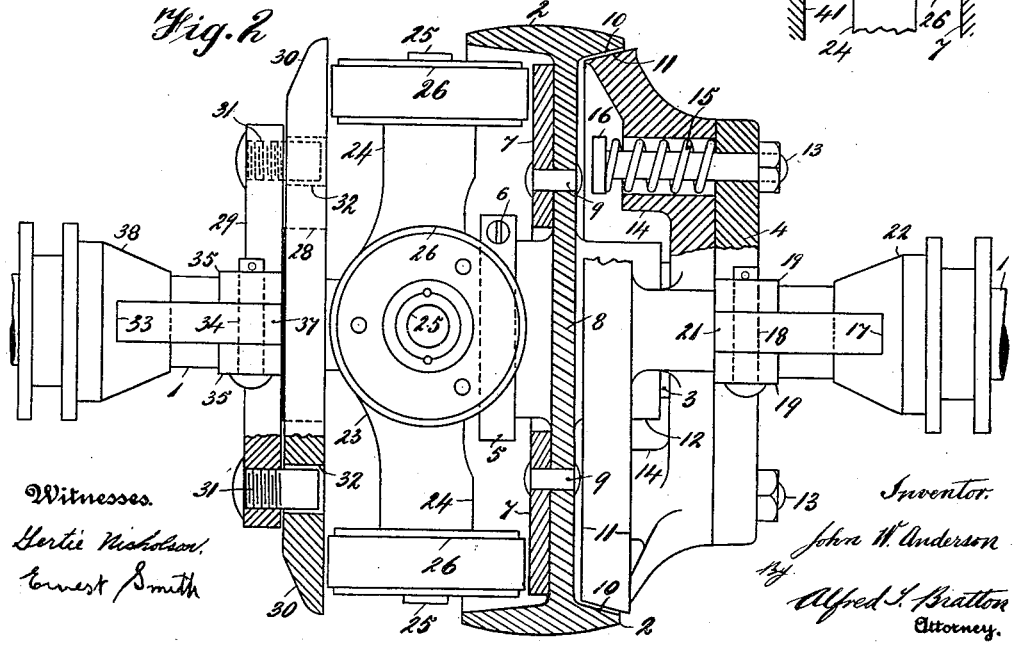

UNITED STATES PATENT OFFICE.

JOHN W. ANDERSON, OF HAMILTON, ONTARIO, CANADA, ASSIGNOR OF ONE-HALF TO ALLITH MANUFACTURING CO., LIMITED, OF HAMILTON, ONTARIO, CANADA.

BELT-DRIVEN FRICTION-GEARING.

1,096,146.      Specification of Letters Patent.     Patented May 12, 1914.

Application filed July 24, 1913. Serial No. 780,913.

*To all whom it may concern:*

Be it known that I, JOHN WILLIAM ANDERSON, a subject of the King of Great Britain and a citizen of the Dominion of Canada, residing at 29 Hess street south, in the city of Hamilton, in the county of Wentworth, in the Province of Ontario, Dominion of Canada, have invented certain new and useful Improvements in Belt-Driven Friction-Gearing, of which the following is a specification.

This invention relates to belt driven friction gearings which are adapted to reverse the motion of shafts used in connection with machinery that is required to be reversed in efficient operation.

The main object of my invention is to provide a belt driven friction gearing of the kind referred to which necessitates the use of only one pulley and one belt, instead of two as heretofore.

Another object of my invention is to provide a belt driven friction gearing of the type specified which occupies less space and is more compact than at present obtains.

A further object of my invention is to furnish a belt driven friction gearing which is extremely cheap to manufacture and which furthermore is easy to install and reduces the friction by fifty per cent.

A still further object of my invention is to provide a belt driven friction gearing of the nature set forth with means whereby the speed is increased on the reversed motion.

With these and other objects in view as will more fully hereinafter appear, the invention consists essentially of the novel mechanism and combination of parts hereafter fully described, illustrated by the accompanying sheet of drawings forming a part of this specification, and particularly pointed out by the appended claims.

In the drawings, Figure 1, is a central longitudinal section of a belt driven friction gearing embodying my improvements. Fig. 2, is a plan of the same, certain parts being broken away or in section, for the sake of clearness. Fig. 3, is a detail specifically referred to in the subsequent description.

Like characters of reference designate the same or similar parts in all the figures.

According to the form of my invention illustrated 1, designates part of a counter shaft adapted to be driven by a belt pulley 2, from any convenient source of power in either direction; that is to say, said shaft may be rotated in a clockwise, or contra clockwise direction, and vice versa. This pulley 2, is loosely mounted on a sleeve 3, rigidly fixed to the counter shaft 1, and furnished with a flanged portion 4, at one end, and a threaded split collar 5, at the other end. Said split collar 5, serves as a thrust bearing and it is rigidly clamped in adjusted position on the threaded end of the sleeve 3, by means of a set screw 6, in the well known way.

7, is an annular disk rigidly secured to the web or arms 8, of the pulley 2, by rivets 9, 9, for the purpose hereafter explained. Or, instead of attaching the annular disk 7, to the web or arms as set forth—and which is specially intended to be employed when applying my invention to pulleys already in use—the annular disk may be formed integral with the web or arms of the pulley 2.

The inner surface at one side of the pulley 2, is formed with a beveled circumferential seat 10, with which the correspondingly beveled outer surface 11, of the clutch member, is adapted to coöperate to drive the shaft 1, in the same direction as said pulley 2, is rotating as hereafter explained. The clutch member is loosely mounted on the sleeve 3, between the boss 12, of the pulley 2, and the flange 4, above referred to, and it is elastically clamped thereto by diametrically opposed bolts 13, 13, passing through bosses 14, 14, surrounded by compression springs 15, 15, said springs being disposed between the heads 16, 16, of the bolts 13, 13, and the under face of the collar 4, in the well known way.

17, 17, are fingers hingedly mounted at 18, 18, between diametrically opposed ears 19, 19, arranged at right angles to the aforesaid bolts 13, 13; said ears being integral with the flange 4. These fingers 17, 17, are provided with heels 20, 20, normally resting on the outer circumferential edge of the flange 4, and toe or nose portions 21, 21, adapted to project the clutch member into frictional engagement with the beveled seat 10, of the pulley 2.

22, is a coned spool loosely mounted on the counter shaft 1, and it is adapted as hereafter explained to expand the fingers 17, 17, when it is desired to couple up the clutch and drive the counter shaft 1, in the same direction as the pulley 2, is rotating.

23, is a four armed spider loosely mounted on the counter shaft 1, on the opposite side of the pulley 2, to that occupied by the above described mechanism, and it is provided at the ends of the radial arms 24, 24, with pintles 25, 25, on which are revolubly mounted vulcanized rubber, or composite rubber and canvas rollers 26, 26, for the purpose hereafter explained. One of said pintles 25, is longitudinally extended and is slidably housed at its free end 27, in any suitable manner to prevent the spider 23, from rotating. Obviously any number of arms 24, 24, from two upward may be employed in conjunction with the spider 23.

28, is a second collar securely fixed on the counter shaft 1, and it is furnished with a flanged portion 29, against which rests a loose disk 30. This disk 30, serves to drive the counter shaft 1, in a reverse direction to that effected by the clutch member above described, and it is prevented from rotating relative to the collar 28, by means of two diametrically opposed pins 31, 31, rigidly fixed in said collar and taking into holes 32, 32, in the disk 30.

33, 33, are fingers hingedly mounted at 34, 34, between diametrically opposed ears 35, 35, arranged at right angles to the aforesaid pins 31, 31, said ears being integral with the flange 29. These fingers 33, 33, are provided with heels 36, 36, normally resting on the outer circumferential edge of the flange 29, and toe or nose portions 37, 37, adapted to project the loose disk 30, against the rollers 26, 26, which in turn are forced against the annular disk 7, on the web or arms 8, of the pulley wheel 2.

38, is a coned spool loosely mounted on the counter-shaft 1, and it is adapted as hereafter explained to expand the fingers 33, 33, when it is desired to reverse the direction of rotation of the said counter shaft 1, to that followed by the pulley 2.

In many instances it is desirable that the speed on the return stroke of the machine, or in other words when the counter-shaft 1, is rotating in a contrary direction to that of the pulley wheel 2, be increased. In such cases I form the rollers 26, 26, as shown in Fig. 3, that is to say with two diameters 39, 40, and recess the disk 30, at 41, so that when said disk is forced against the rollers 26, a diagonal drive is set up with the result that the shaft 1, is relatively speeded up.

An anti-friction thrust ball bearing may be provided between the end of the boss 12, and the inner adjacent face of the clutch member 11, at 42, to absorb the thrust when the shaft 1, is reversed and thereby prevent the said clutch member from being brought into frictional engagement with the beveled seat 10, as will be self evident to those skilled in the art to which my invention appertains.

The usual elements will be fitted in connection with the spools 22, 38, for operating the device, but as they form no part of my invention they are not further described or illustrated.

The operation of my improved belt driven friction clutch is briefly as follows:—Assuming the pulley 2, is running constantly in a clockwise direction and that the shaft 1, runs in a similar direction when the machine tool is on its forward stroke, the operator forces the spool 22, between the fingers 17, 17, in the well known way. This operation expands said fingers 17, 17, about their points of suspension 18, 18, and thereby forces the toes 21, 21, against the clutch member bringing the beveled outer surface 11, thereof into frictional engagement with the correspondingly beveled circumferential seat 10, of the pulley 2, whereupon the counter shaft 1, is driven in a clockwise direction. To reverse the motion of the countershaft 1, the operator moves the spool 38, between the fingers 33, 33, which in turn are rocked outwardly on their pivots 34, 34, forcing the toe portions 37, 37, against the loose disk 30, which in turn contacts with the rollers 26, 26, thereby moving the spider 23, axially of the counter-shaft 1, until said rollers 26, 26, frictionally engage the annular disk 7. Immediately this operation takes place the rollers 26, 26, are rotated in a clockwise direction at right angles to the plane of rotation of the annular disk 7, and the said rollers simultaneously commence to rotate the loose disk, 30, its connected parts and the counter-shaft 1, in a contra-clockwise direction as will be self evident without further explanation or description.

While I have described one specific embodiment of my invention, it is to be clearly understood that it is not intended to be restrictive, various alterations in the details and other combinations of the several parts being permissible, without in any way departing from the spirit and scope of my said invention; and, it is intended fully to include all such within the present application, and as limited by the appended claims.

Having thus fully described my invention, what I claim as new and desire to secure by Letters Patent, is:—

1. The combination with a driven shaft of a driving pulley loosely mounted to rotate thereabout, a clutch arranged to clutch said pulley to said shaft to cause them to rotate together, a member connected for rotative movement with said shaft, and for axial movement with relation to said shaft, rollers disposed between said member and said pulley with their peripheries contacting with both the said member and the pulley, and means for forcing said member toward said pulley.

2. The combination with a driven shaft of a driving pulley loosely mounted to rotate thereabout, a clutch arranged to clutch said pulley to said shaft to cause them to rotate together, a member connected for rotative movement with said shaft and for axial movement with relation to said shaft, a spider loosely mounted upon said shaft between said member and said pulley, rollers carried by said spider and having their peripheries disposed in contact with said member and said pulley, when said member is forced toward said pulley.

Signed at Hamilton, in the county of Wentworth, Province of Ontario, Dominion of Canada, this 17th day of July, A. D. 1913.

JOHN W. ANDERSON.

In the presence of—
ALFRED T. BRATTON,
GERTIE NICHOLSON.

Copies of this patent may be obtained for five cents each, by addressing the "Commissioner of Patents, Washington, D. C."